United States Patent [19]
Pepper et al.

[11] Patent Number: 5,930,700
[45] Date of Patent: Jul. 27, 1999

[54] SYSTEM AND METHOD FOR AUTOMATICALLY SCREENING AND DIRECTING INCOMING CALLS

[75] Inventors: David J. Pepper, Basking Ridge; Sharad Singhal, Mendham; E. Scott Soper, Morris Plains, all of N.J.

[73] Assignee: Bell Communications Research, Inc., Morristown, N.J.

[21] Appl. No.: 08/757,983

[22] Filed: Nov. 27, 1996

Related U.S. Application Data

[60] Provisional application No. 60/007,935, Nov. 29, 1995.

[51] Int. Cl.⁶ ..................................................... H04Q 7/24
[52] U.S. Cl. ........................................... 455/414; 379/211
[58] Field of Search .................................. 379/67, 88, 165, 379/196, 211, 210, 201; 455/417, 445, 461, 414

[56] References Cited

U.S. PATENT DOCUMENTS

| | | | |
|---|---|---|---|
| 4,723,273 | 2/1988 | Diesel et al. | 379/211 |
| 4,975,941 | 12/1990 | Morganstein et al. | 379/88 |
| 5,289,528 | 2/1994 | Ueno et al. | 379/67 |
| 5,309,509 | 5/1994 | Cocklin et al. | 379/165 |
| 5,329,578 | 7/1994 | Brennan et al. | 379/67 |
| 5,452,340 | 9/1995 | Engelbeck et al. | 379/67 |
| 5,467,388 | 11/1995 | Redd, Jr. et al. | 379/196 |
| 5,511,111 | 4/1996 | Serbetcioglu et al. | 455/414 |
| 5,610,970 | 3/1997 | Fuller et al. | 455/31.2 |

*Primary Examiner*—William Cumming
*Assistant Examiner*—Myron K. Wyche
*Attorney, Agent, or Firm*—Joseph Giordano; David A. Hey; Loria B. Yeadon

[57] ABSTRACT

A system and method that allow a subscriber to have incoming telephone calls automatically screened and directed is described. The system allows a subscriber to automatically manage his incoming communications in a way that is easy to control and which requires a minimum of unnecessary interruptions. The system includes a graphical user interface (GUI) which is accessible through the subscriber's personal digital assistant (200), a Network Interface (304), a service control module (306), and a database (308). The system and method allow a subscriber to have all of his incoming telephone calls screened in order to identify those that are of the high importance to the subscriber. The subscriber controls this system by user-friendly interfaces to a name and telephone number database and an appointment calendar database. By entering schedule information into an appointment calendar (including times and locations of meetings and other events) and by entering client's information into the name and telephone number database, the subscriber indicates how to locate the subscriber so that important calls will reach him immediately. These databases also tell the system which clients are of high priority to the subscriber so that lower priority calls can be directed to a voice mail system for access at the subscriber's convenience or routed to an attendant for action.

1 Claim, 10 Drawing Sheets

Appointments for September 8, 1995

| | |
|---|---|
| 8:00am | |
| 9:00am | |
| 10:00am | CARIN Meeting at 829-4544 on CallDirector |
| 11:00am | |
| 12:00am | |
| 1:00pm | |
| 2:00pm | |
| 3:00pm | |
| 4:00pm | |
| 5:00pm | |
| 6:00pm | |

DateBook

Customer: dpepper   File: dpepper_Datebook.dat

Save   Load

Prev.   September   Next   Prev.   1995   Next

| Sun | Mon | Tue | Wed | Thu | Fri | Sat |
|---|---|---|---|---|---|---|
|  |  |  |  |  | 1 | 2 |
| 3 | 4 | 5 | 6 | 7 | 8 | 9 |
| 10 | 11 | 12 | 13 | 14 | 15 | 16 |
| 17 | 18 | 19 | 20 | 21 | 22 | 23 |
| 24 | 25 | 26 | 27 | 28 | 29 | 30 |

Prev   Show   Next

Message: Welcome To The DateBook

Quit the DateBook application

FIG. 10

| CallCommand | |
|---|---|
| Customer: David J. Pepper | |
| You have an incoming call from: George Heilmeier Type: Voice | |
| Please Choose An Option: | |
| Accept At | 908-953-3000| |
| Forward To | 201-829-5555 |
| Refuse Direct Call To Voice Mail | |
| Accept the call at number | |

FIG. 11

| MessageNotification | | |
|---|---|---|
| Customer: David J. Pepper | | URGENT |
| You have a new message from: George Heilmeier Type: Voice Length: 45 Seconds | | |
| Done | | |

SYSTEM AND METHOD FOR AUTOMATICALLY SCREENING AND DIRECTING INCOMING CALLS

RELATED PROVISIONAL APPLICATION AND RELATED APPLICATIONS

This application claims the benefit of U.S. Provisional application Ser. No. 60/007,935, filed on Nov. 29, 1995 and entitled "A System and Method for Automatically Screening and Directing Incoming Calls". This application includes the same inventors as named and discloses subject matter claimed herein. The content of this provisional application is incorporated herein by reference.

The following pending U.S. patent applications include subject matter related to the present invention:

(1) U.S. patent application Ser. No. 08/309,336, entitled "Personal Communications Internetworking", filed on Sep. 19, 1994 and assigned to the assignee herein now U.S. Pat. No. 5,742,905, issued Apr. 21, 1998; and (2) U.S. patent application Ser. No. 08/466,626, entitled "Real-Time Control of Voice Delivery", filed on Jun. 6, 1995 and assigned to the assignee herein now abandoned. The content of these applications is incorporated herein by reference.

BACKGROUND OF THE INVENTION

1. Field of the Invention

The present invention relates to personal communications and, more particularly, to a system and method for screening and routing calls—such as voice messages, faxes, e-mails, and the like—directed to a communications services subscriber.

2. Discussion of Related Art

Today, mobile communications are essential to persons conducting business away from the office. The person accessible to clients and potential clients typically obtains a decisive advantage over the person not accessible. Thus, wireless communications, such as cellular telephones, pagers, and personal digital assistants (PDAs) and which permit communications to be directed to the person regardless of location are invaluable to those persons who often conduct business away from the office. It is, however, desirable to limit the calls that are directed to the person who is conducting business away from the office. The person typically does not want to be interrupted while conducting business to field calls that are not important, that can be handled at a later time, or that can be directed elsewhere.

Figure 1:
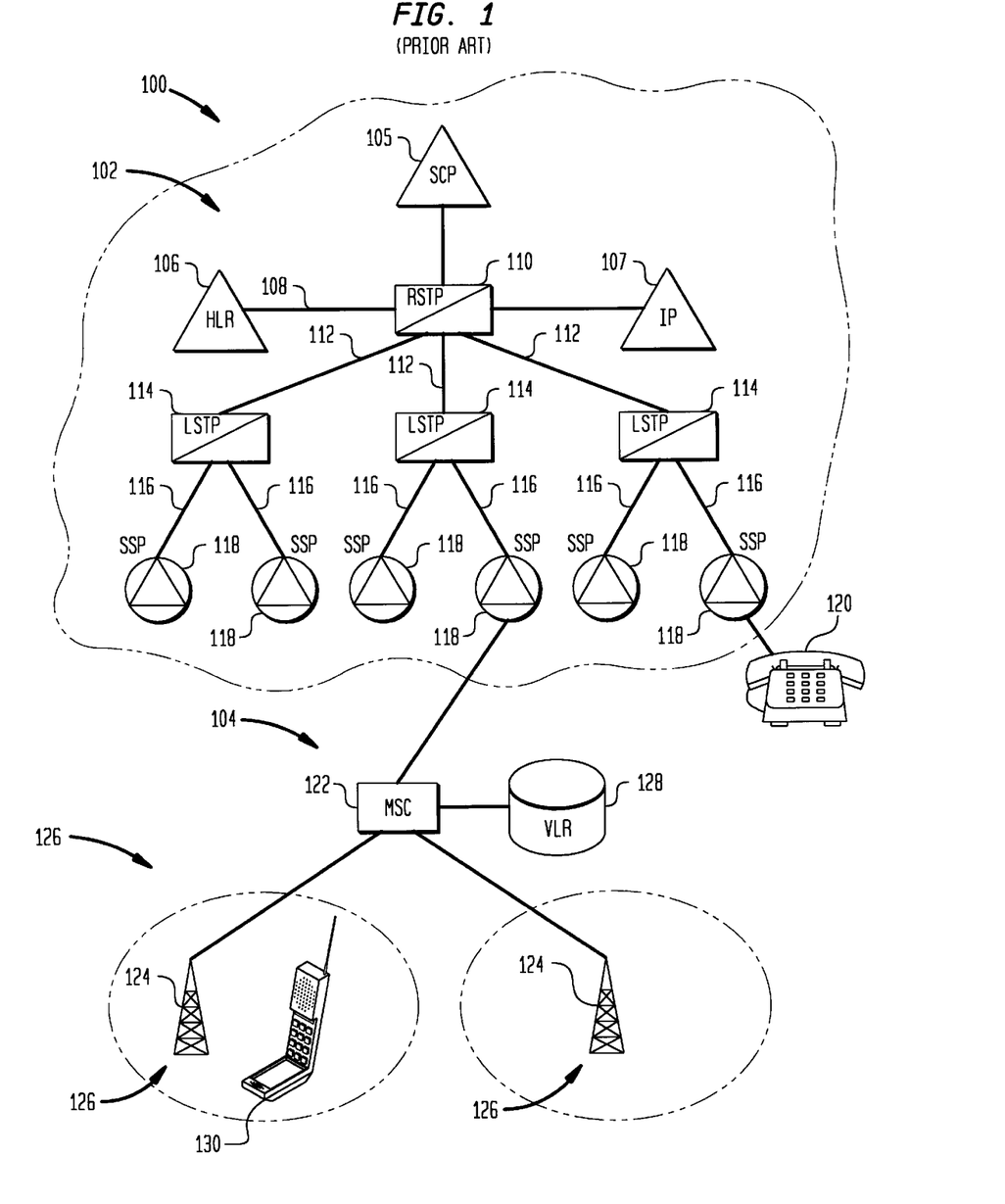
FIG. 1 illustrates a Personal Communications Services network.

FIG. 1 is a greatly simplified illustration of a wireless communications network, called a Personal Communications System (PCS) network 100. The PCS is similar to other types of wireless networks and is described to provide background to the following discussion of the invention; it is not intended by any means to limit the invention to use with PCS systems. Indeed, a person skilled in the art will readily appreciate that the invention may be used in many types of communications systems. The PCS 100 includes a signaling network 102, which supports a switched communications network. A switched communications network may be, for example, a public switched telephone network (PSTN) or an Integrated Signaling Digital Network (ISDN). The signaling network 102 is connected to a wireless communications system 104.

An illustrative signaling network 102 includes (among other things) a network database 105, which may be a service control point (SCP). A database called a Home Location Register (HLR) 106 is part of the signaling network. The HLR 106 is connected via link 108 to a Regional Signaling Transfer Point (RSTP) 110. A network server 107, such as an intelligent peripheral (IP), may be connected to the signaling network via an RSTP 110 or other service switching point. The RSTP 110 is connected via a number of links 112 to several Local Signaling Transfer Points (LSTPs) 114. Each LSTP 114 is connected via a number of local links 116 to a number of switches such as Service Switching Points (SSP) 118. The SSP 118 connects to subscriber premises to provide for premises equipment, such as a wireline telephone 120. An SSP 118 may also connect to one or more Wireless Switching Centers (WSC), Mobile Switching Centers (MSC), or Radio Port Control Units (RPCU) 122, which are part of the wireless communications system 104. The WSC (or MSC or RPCU) 122 is connected to a number of Base Stations (BS) (or Radio Ports (RP)) 124, which monitor a "cell" (or "coverage area") 126. One or more WSC 122 are connected to a second database called the Visiting Location Register (VLR) 128.

The HLR 106 contains a database maintained by a subscriber's (or "user's") local telecommunications service provider at the user's home location. This database includes information about the user, called the user profile. The VLR 128 is maintained by a telecommunications service provider at the location the portable device user and portable device 130 are visiting. The portable device 130 may be a wireless telephone, a personal digital assistant (PDA) having wireless communication applications, or other device. The VLR 128 stores a subset of the HLR 106 user information, and it records that the portable device 130 is currently located in the area serviced by that VLR. The HLR 106 keeps a record of the VLR in which the portable device is currently located. When the portable device 130 travels to an area covered by a different WSC 122, the device is registered in the new WSC 122. The new location is stored in the VLR 128. If the portable device 130 travels to an area covered by another VLR 128, the subset of the HLR 106 data stored in the previous VLR is transferred to the new VLR. The location of the new VLR is stored in the HLR and the previous VLR location is deleted from the HLR 106.

Figure 2:
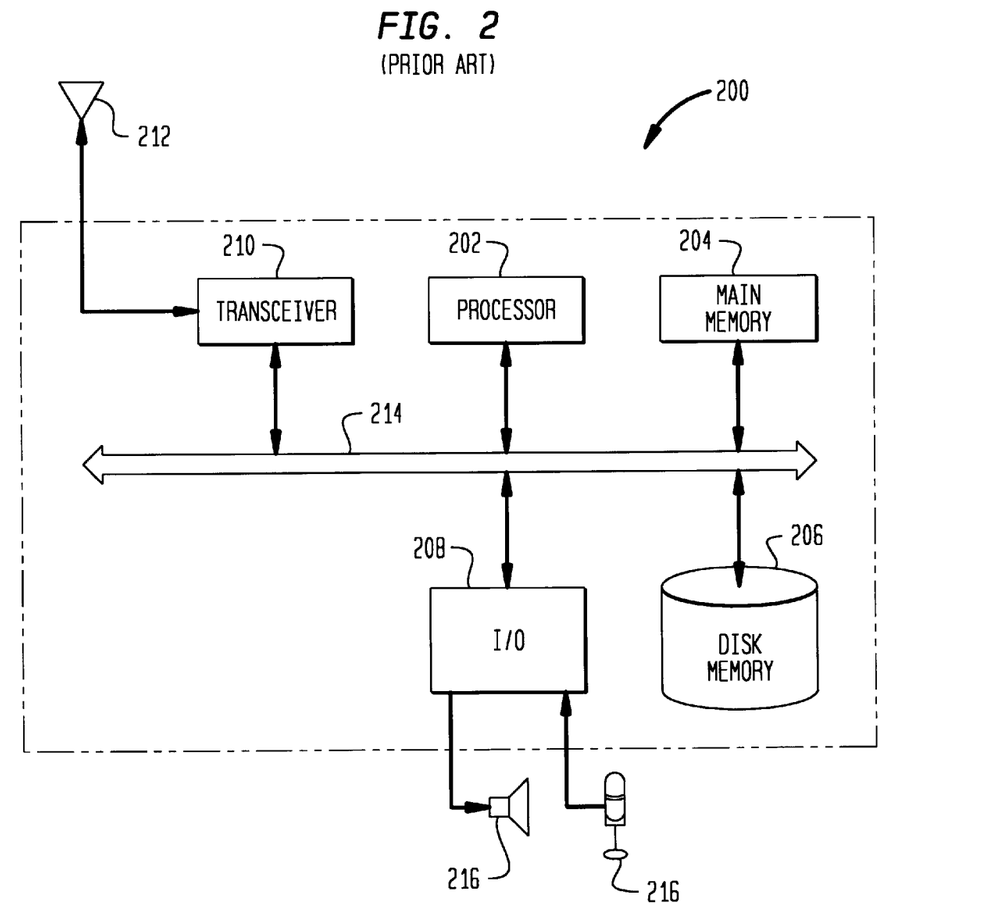
FIG. 2 is a block diagram of a Personal Digital Assistant.

One type of portable device which may be used in a PCS network is a personal digital assistant (PDA). The PDA is typically a laptop or palmtop computer connected to a wireless communications network and which may provide voice, fax, e-mail, and/or other types of communication. FIG. 2 is a block diagram of a typical PDA 200. The PDA 200 may have one or more processors 202, such as a microprocessor, a main memory 204, a disk memory 206, and an I/O 208 such as a mouse, keyboard, or pen-type input, and a screen or monitor. The PDA 200 may also have a wireless transceiver 210 connected to an antenna 212 configured to transmit and receive wireless communications. The processor 202, memories 204, 206, I/O 208, and transceiver are connected to a bus 214. The bus transfers data, i.e., instructions and information, between each of the devices connected to it. The I/O 208 may permit faxes, e-mail, or optical images to be displayed on a monitor or printed out by a printer. The I/O 208 may be connected to a microphone 216 and a speaker 208 so that voice or sound information may be sent and received.

An object of the present invention is a system that serves as a "personal assistant" to subscribers to manage communications and personal information.

A further object of the present invention is a system that allows subscribers to control both incoming and outgoing communications in all media as well as being able to access vast amounts of network based data and that notifies subscribers of high priority calls when appropriate, without disturbing subscribers at awkward times.

It is yet another object of the present invention to provide a system and method for identifying callers to a communications services subscriber, determine a priority ranking for the caller, and route the call to a location where the subscriber may be reached, the PDA, or other destination (such as voice mail or receptionist) according to the determined priority.

SUMMARY OF THE INVENTION

These and other objects of the present invention are provided by a system and method for automatically screening and delivering calls, such as telephone calls, faxes, e-mail, and the like, directed to a communications services subscriber. The calls may be screened according to the subscriber's schedule and priority attributed to the caller.

The invention preferably receives a call, attempts to determine the origin of the call, compares the identified call origin to the subscriber's priority for that origin, determines the subscriber's call delivery preferences for calls of that priority (which may vary according to the time of day and subscriber's location) and routes the call accordingly. The invention may route a high priority call directly to the subscriber at a call delivery address (e.g., phone number, fax number, etc.) at which the subscriber is currently located; route a low priority call to a message storage, such as voice mail, office computer, or fax machine; or query the subscriber as to how to direct the call. Call screening priorities may be modified using a priority threshold assigned to each scheduled call delivery address.

In a preferred embodiment of the present invention, the system includes (1) a database containing call origin priority information, call delivery preferences, and subscriber appointment schedule information such as call delivery address and times at which the subscriber expects to be at the call delivery addresses, (2) a network interface configured to receive an incoming telephone call, to connect the call to the appropriate destination, send call identification information to a service control module, and—if necessary—to match a sample of the caller's voice to a stored set of voice samples to determine the caller's identity; (3) a service control module connected to the network interface to manage the process of incoming calls and responsive to the database to determine the appropriate destination for the call; and (4) a user interface for receiving calls from the service control nodule and for maintaining schedule and caller priority information from the subscriber.

To use a preferred embodiment of the inventive system, the subscriber enters a schedule and a list of clients into a graphical user interface that is available on a communications device, such as a Personal Digital Assistant (PDA). From there, the system takes over, routing the subscriber's important calls at predesignated call delivery addresses, such as wireline numbers, where the subscriber is currently located and transferring unimportant calls to voice mail or to another predetermined destination. In some cases, the system will query the subscriber through the PDA to obtain a preference on how to handle the incoming call. Thus, by giving a single contact number to his clients, and by keeping the inventive system informed of the subscriber's current schedule, a subscriber obtains the flexibility of always being reachable by his important clients while being able to control when others are able to reach him.

BRIEF DESCRIPTION OF THE DRAWINGS

The present invention is described with reference to the following figures.

A Glossary of acronyms is attached as Appendix A.

DETAILED DESCRIPTION OF PREFERRED EMBODIMENTS

The present invention is described in the following sections:

I. Overview of the Invention: an overview of the invention is provided with reference to FIGS. 3 and 4;

II. The Network Interface: the structure and operation of the network interface is described with reference to FIG. 5;

III. The Service Control Module: the structure and operation of the service control module is described with reference to FIG. 6;

IV. The User Interface: the PDA/user interface is described with reference to FIGS. 7–11;

V. The Database: the subscriber information database is described;

VI. An Exemplary Call Flow: an exemplary call flow is described with reference to FIGS. 12A and 12B; and VII. Conclusion: a conclusion is provided.

I. Overview of the Invention

Aspects of the present invention include a system and method for automatically or interactively screening and directing subscribers' incoming telephone calls. The inventive system serves as an automated personal assistant which allows a subscriber to automatically manage incoming communications in a way that is easy to control and which requires a minimum of unnecessary interruptions.

The inventive system and method allow a subscriber to have incoming telephone calls screened in order to identify those calls that are of the highest importance to the subscriber. Preferably, the subscriber controls this system by manipulating user-friendly interfaces to store information into databases, including a database containing names and telephone numbers and a client priority list (the PhoneBook database), and a database containing an appointment calendar which may include locations and call delivery addresses (e.g., phone numbers) of where the subscriber is expected to be throughout the day (the DateBook database).

By entering the subscriber's schedule into the DateBook database (including times and locations of meetings and other events) and by entering client information into the PhoneBook database, the inventive system has sufficient information to identify the origin of many incoming calls and to contact the subscriber such that high priority calls will reach the subscriber immediately. The PhoneBook database also includes contact information accessible by the system regarding the priority assigned by the subscriber to each client such that less important calls can be directed to a voice mail system for retrieval at the subscriber's convenience, routed to an attendant for action, or handled in a manner pre-designated by the subscriber.

Figure 3:
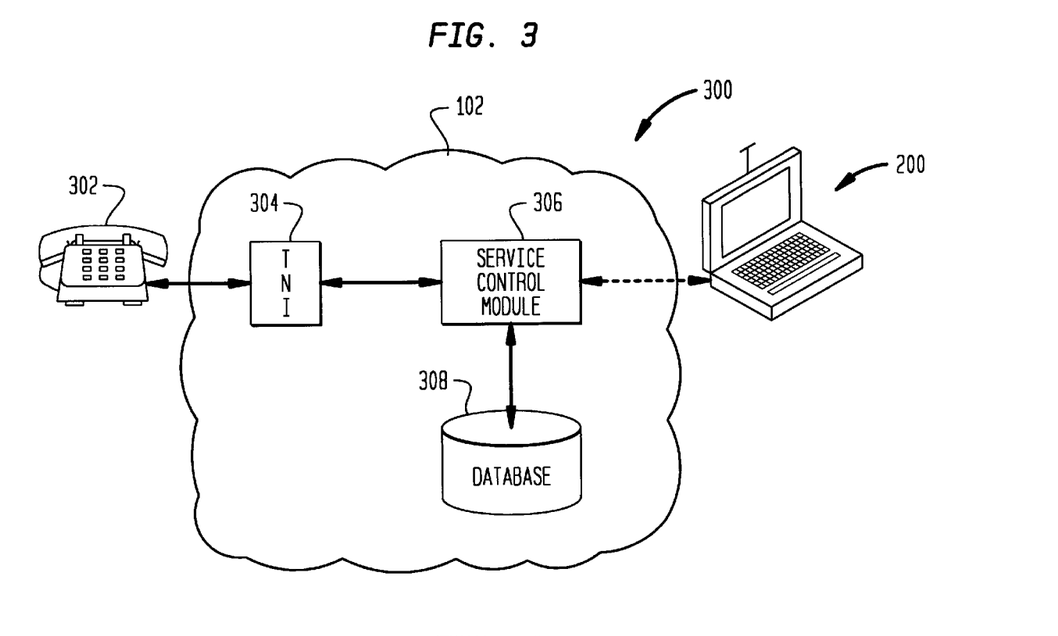
FIG. 3 is a block diagram of an overview of a system according to a preferred embodiment of the present invention.

FIG. 3 is a diagram illustrating a communications network 300 including the present invention. The network 300 receives a call from a communications device 302, such as a telephone, fax machine, or computer terminal. The communications device 302 is connected to a network interface 304, which is preferably a telephone network interface (TNI) located in the signaling network 102. The TNI is connected to a service control module 306, which is also preferably located in the signaling network 102. The service control module 306 is in wireless or wireline communication with the subscriber's PDA 200. The PDA 200 preferably includes software stored in its memory 204, 206, which includes databases of caller priorities, the call recipient's schedule, and a graphical user interface (GUI) which appears on a screen or monitor of the PDA 200. The PDA may also be in communication with a database 308. The database may contain a copy of the subscriber's PhoneBook and DateBook databases. Preferably, the database 308 automatically synchronizes with the information stored in the subscriber's PDA 200. The service control module 306 communicates with the TNI 300 and databases to determine how to route an incoming call and communicates with the PDA 200 to inform the subscriber of recently received messages and to query the subscriber about the handling of certain calls.

Figure 4:
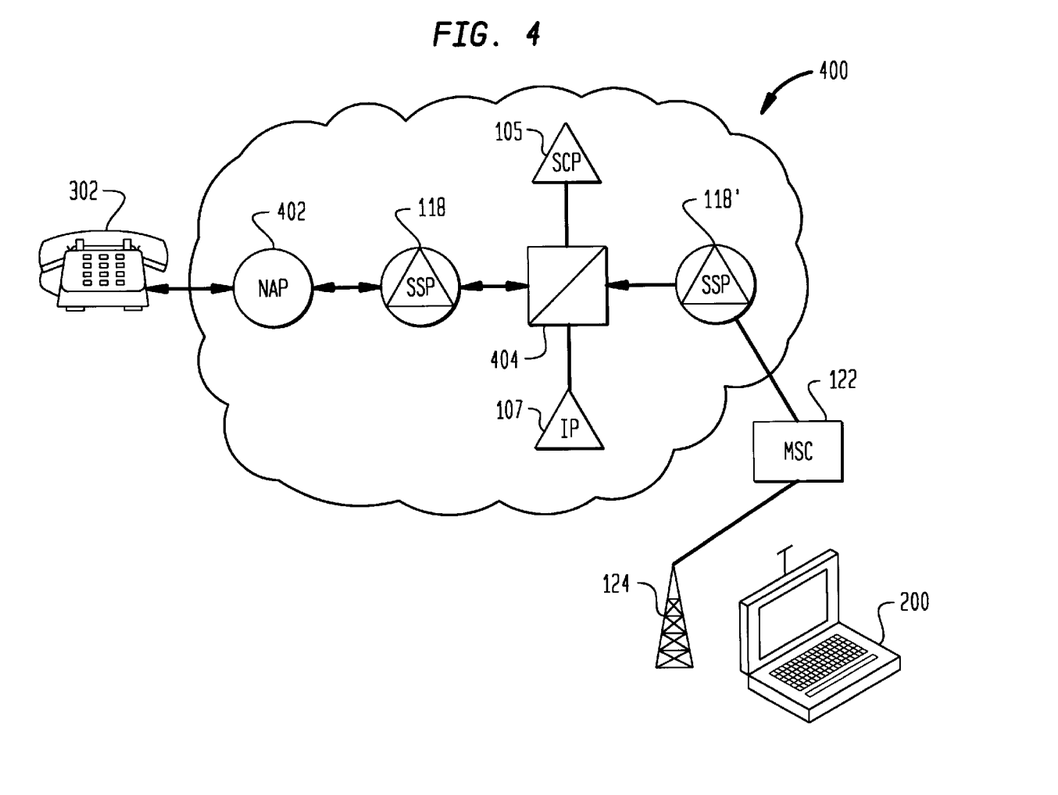
FIG. 4 is a more detailed diagram of the invention of FIG. 3 implemented in an Advanced Intelligent Network environment.

Many network architectures may implement the inventive call directing and screening system and method. The present invention is herein illustratively described using an Advanced Intelligent Network (AIN). Details of AIN are provided in "Advanced Intelligent Network Release 1 Network and Operations Plan", Special Report, SR-NPL-001623, Issue 1, Jun. 1990, published by Bell Communications Research. The content of this document is incorporated herein by reference. A more detailed illustration of a call directing and screening system according to the present invention as implemented in the AIN environment is shown in FIG. 4. In FIG. 4, the communications device 302 connects to a network access point (NAP) 402, the NAP is connected to an SSP 118, the SSP connects to a Signal Transfer Point (STP) 404 (which for simplicity may represent one or more RSTPs and LSTPs collapsed into a single network element); the STP 404 is connected to an SCP 105, an IP 107, and a second SSP 118'. The second SSP 118' connects to an MSC 122 which connects to a base station 124. The base station 124 is in wireless communication with the PDA 200.

Referring again to FIG. 3, the TNI 304 is preferably connected to the service control module 306 through a signaling network 102 connection. The subscriber uses the GUI to enter in his daily schedule and his list of clients. The GUI also alerts the subscriber when the service control module 306 communicates with the PDA about new pending messages and to determine if the subscriber wants to accept a given call or forward it on to the voice mail portion of the service control. The database 308 maintains a network copy of the subscriber's daily schedule and client list which are used, along with the subscriber's default profile, to determine which calls to forward directly to the subscriber at his current location, which calls to forward to the subscriber's voice mail box, and when to let the subscriber decide what to do with a particular call.

When a call comes in for a subscriber, the TNI 304 answers the call and alerts the service control module 306 that a call has been received for a given line which may be determined by Dialed Number Identification Service (DNIS) from a given location which may be determined by Automatic Number Identification (ANI) (e.g., "Caller ID"). The service control module 306 uses the DNIS information to determine who the subscriber is that the call is directed to and then uses the subscriber's client list (i.e., the PhoneBook database) in the network database 308 to attempt to identify the call origin using the associated ANI information. If the call origin cannot be identified from the ANI, a speaker identification stage may be tried. The TNI 304 uses a conventional speech sample template that has been trained using a previously received call or voice mail message. The speech on the current incoming call is compared to the samples in the template to determine if the voice matches a known voice.

Figure 10:
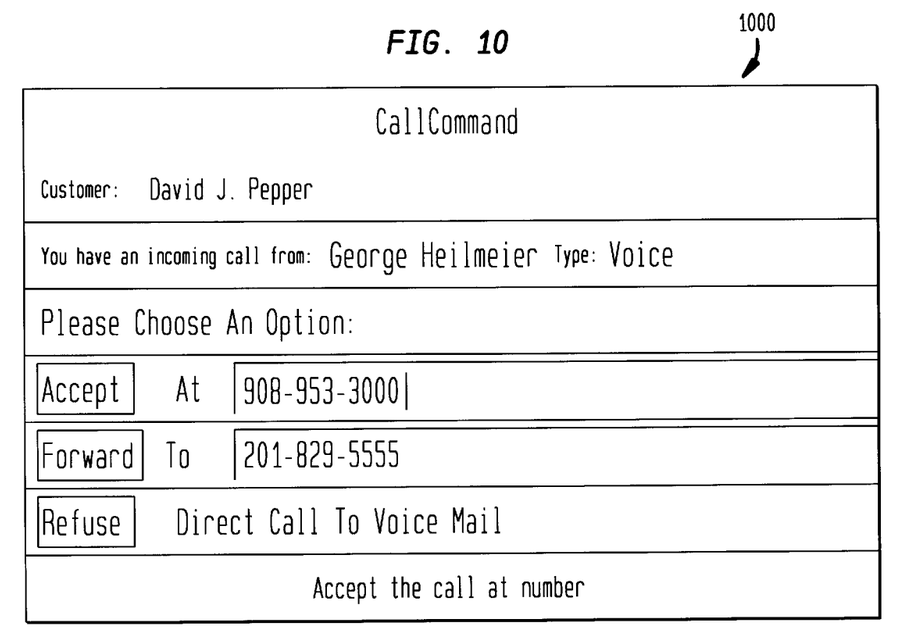
FIGS. 10 and 11 are screens of pop-up windows which may occur on a graphical user interface according to a preferred embodiment of the invention.
Figure 11:
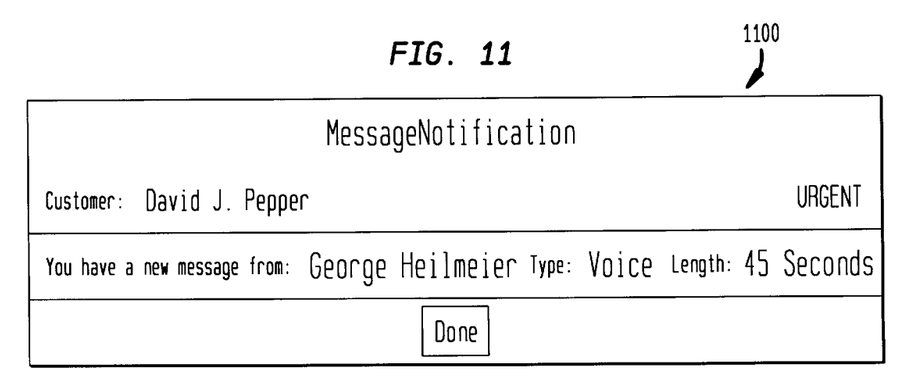

Once the caller has been identified using either the PhoneBook database or speaker identification, the system refers to the subscriber's PhoneBook database to determine the priority that the subscriber has assigned to the caller. If the call is to be directed to the subscriber, the system refers to the subscriber's schedule (found in the DateBook database) in order to determine at what address (e.g., phone number) the subscriber is currently located. Depending on the subscriber's schedule and the caller's assigned priority, the caller may be connected directly to the subscriber at a telephone number listed in the appointment calendar or to the PDA 200 (if it has voice communications) or to any other predetermined call delivery address. The subscriber may be notified by an interactive GUI pop-up window 1000 seen in FIG. 10, that there is a pending call and queries as to how the call should be handled, or the caller can be directed to the voice mail subsystem or other predetermined destination. If the caller leaves a voice mail message, the subscriber is notified via a GUI pop-up window 1100 as seen in FIG. 11, informing the subscriber that a new message has been received. If the subscriber did not register his PDA with the system (or if the PDA is not in contact with the network), then the interactive GUI pop-up window may not be available, and the caller will be directed to the subscriber's voice mail system.

II. The Network Interface

The network interface 304 handles all calls placed to the inventive call directing and screening system and can place an outgoing call when directed to by the service control module 306. Preferably, the network interface is a telephone network interface (TNI).

Figure 5:
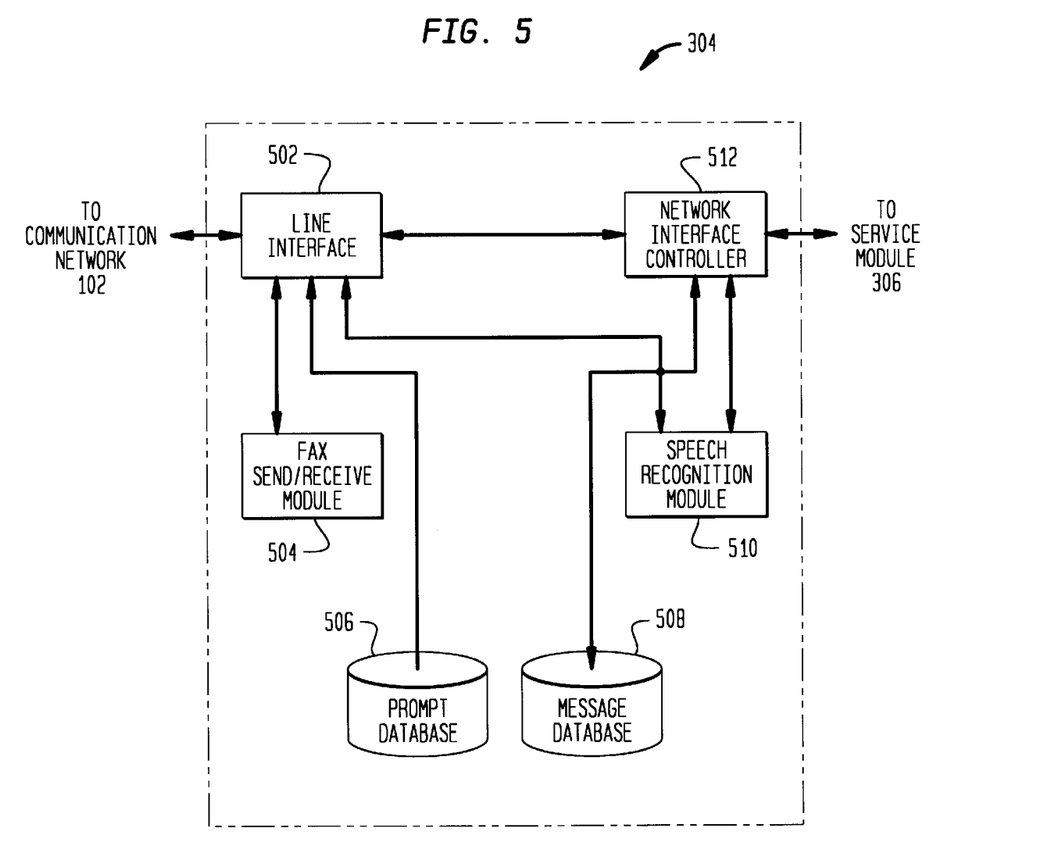
FIG. 5 is a block diagram of a network interface according to a preferred embodiment of the present invention.

FIG. 5 is a block diagram of a preferred TNI 304 according to the present invention. The TNI 304 has a line interface 502, a fax send/receive module 504, a prompt database 506, a message database 508, a speech recognition module 510, and a network interface controller 512. The functions of the TNI 306 include: the line interface 502 answers calls and collects Automatic Number Identification (ANI) and Dialed Number Identification Service (DNIS) information associated with a call; the prompt database 506 provides standard messages which may be played by the system to the caller, the message database 508 records the caller's responses (voice and/or DTMF) and stores received messages; the speech recognition module 510 identifies a caller (using pre-recorded voice sample templates), generates a voice template for a caller, and stores the voice templates; and the network interface controller 512 places outgoing calls (to the subscriber), bridges two calls together, and exchanges messages with the service control module 306. A fax send/receive module 504 is provided to handle fax calls.

In an AIN environment, the TNI 304 may be located in a NAP 404, SCP 105, or IP 107, distributed among these network elements, or be partially or entirely contained in a separate dedicated network element.

III. The Service Control Module

Figure 6:
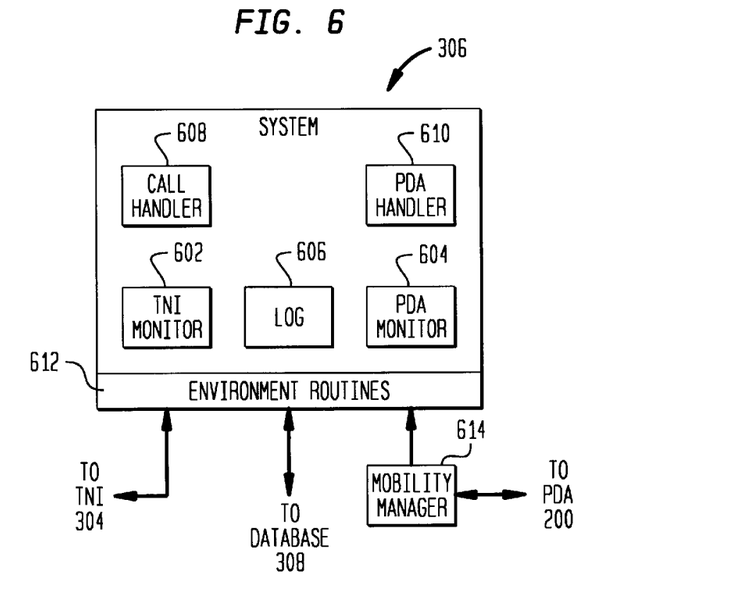
FIG. 6 is a block diagram of a service control module according to a preferred embodiment of the present invention.

The service control module 306 is the central processing unit of the inventive call directing and screening system. This module exchanges messages with both the TNI 304 and the PDA 200, obtains information from the database 308, and controls the actions of the system.

The service control module 306 is illustrated in FIG. 6 and includes: a TNI monitor 602, a PDA monitor 604, a log 606, a call handler 608, a PDA handler 610, and environment routines 612 which allow the system to access the system database and communicate with the network interface 304 and the subscriber's PDA 200. Each of these elements is described below.

The service control module 306 is connected via the communications network to the TNI 304 and to a database, such as an SCP 105. The module 306 may also be in wireless or wireline communication with the subscriber's PDA 200. In a preferred embodiment, a mobility manager 614 may act as an interface between the Service Control Module 306 and the PDA 200. Mobility managers are well known and are described, for example, in the U.S. Patent identified above.

In the inventive call directing and screening system, the service control module 306 has a TNI monitor 602 which waits for new incoming calls registering with the system. Once a call is detected by the TNI monitor 602, the call handler 608 initiates a call handling process.

The PDA monitor 604 waits for new PDAs to register with the system. Once a PDA registers with the system and a PDA call is detected by the PDA monitor 604, the PDA handler 610 initiates a PDA handling process which then handles all of the interactions to properly direct that call. The PDA handling process allows the subscriber to check for new messages and to be notified of any incoming telephone calls.

The log 606 performs a procedure to log system usage information and to send system status messages to a service provider. The service control module preferably communicates with the other components of the call directing and screening system (e.g., the TNI 304, the PDA 200, and the database 308) through "environment" routines 612 which handle the low level communications and database access functions needed by the system. The environment routines may be provided in Specification and Description Language (SDL), which is a CCITT standard language for interface and design specification.

An illustrative AIN mapping of the system places the service control module 306 functionality directly in the SCP 105. This mapping may require a great deal of message traffic between the SCP 105 and the IP 107, with the SCP being required to handle every step of the subscriber and client interactions. The SCP also controls initiating an outgoing call to the subscriber or his voice mail system (if separate) and communicating with the IP 107 that is running another portion of the system.

In a second illustrative embodiment, the service control module 306 functionality is a main function in the IP 107 that is invoked by the SCP 105. This mapping may require a minimum of communications between the SCP and the IP, where the SCP is only involved at the start-up of the call. This mapping assumes that the IP can originate an outgoing call (to the subscriber and/or the subscriber's voice mail system, if this is a completely separate system) and to transfer the caller to the subscriber at the subscriber's request. Multiple IPs may be provided to support all of the system functions (e.g., one handling the client interactions and one handling the subscriber's interactions through his PDA).

In an illustrative embodiment, the service control module 306 is implemented in SDL. SDL allows for a graphical programming methodology, where procedures are specified by flow-charts and where all interactions between procedures (and the outside environment, including the PDA and TNI module) are expressed as a series of messages. This allows for a very flexible system, where the function of the system can be modified by simply redrawing the appropriate flow-charts. The SDL system also allows for multiple independent and interdependent processes, each of which controls its own portion of the system. An SDL system can also define how many of each type of process are allowed in the full system. Thus, by defining a process to handle a single telephone call, the system can be easily scaled up to handle any number of independent calls, simply by allowing the system to have more of the call handler processes.

IV. The User Interface

Figure 7:
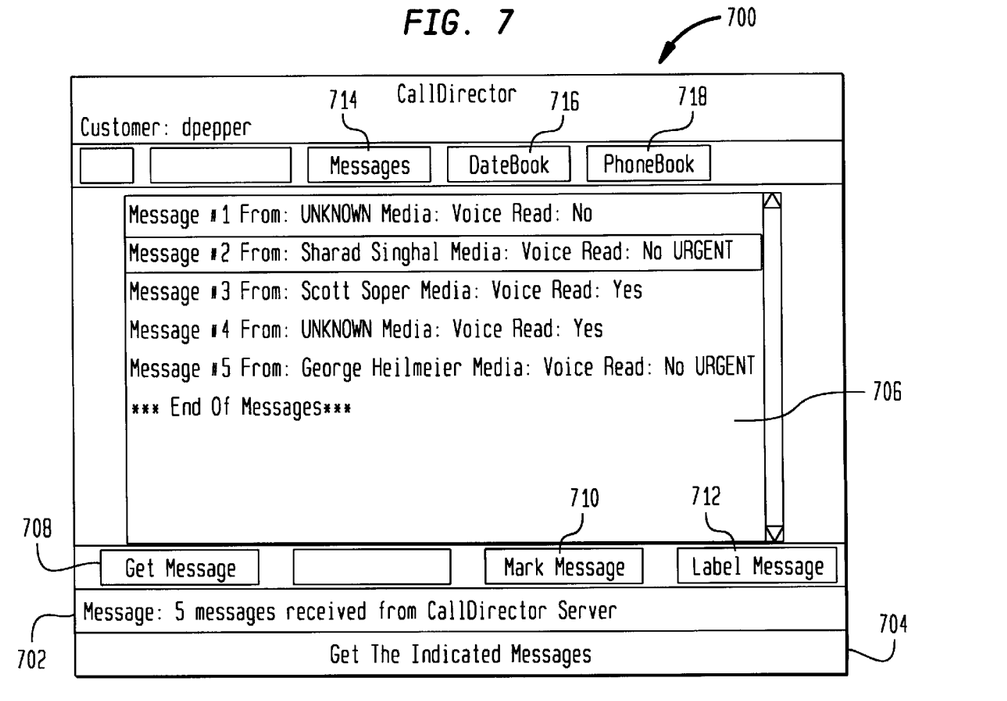
FIG. 7 is a main menu screen of a graphical user interface according to a preferred embodiment of the present invention.
Figure 8:
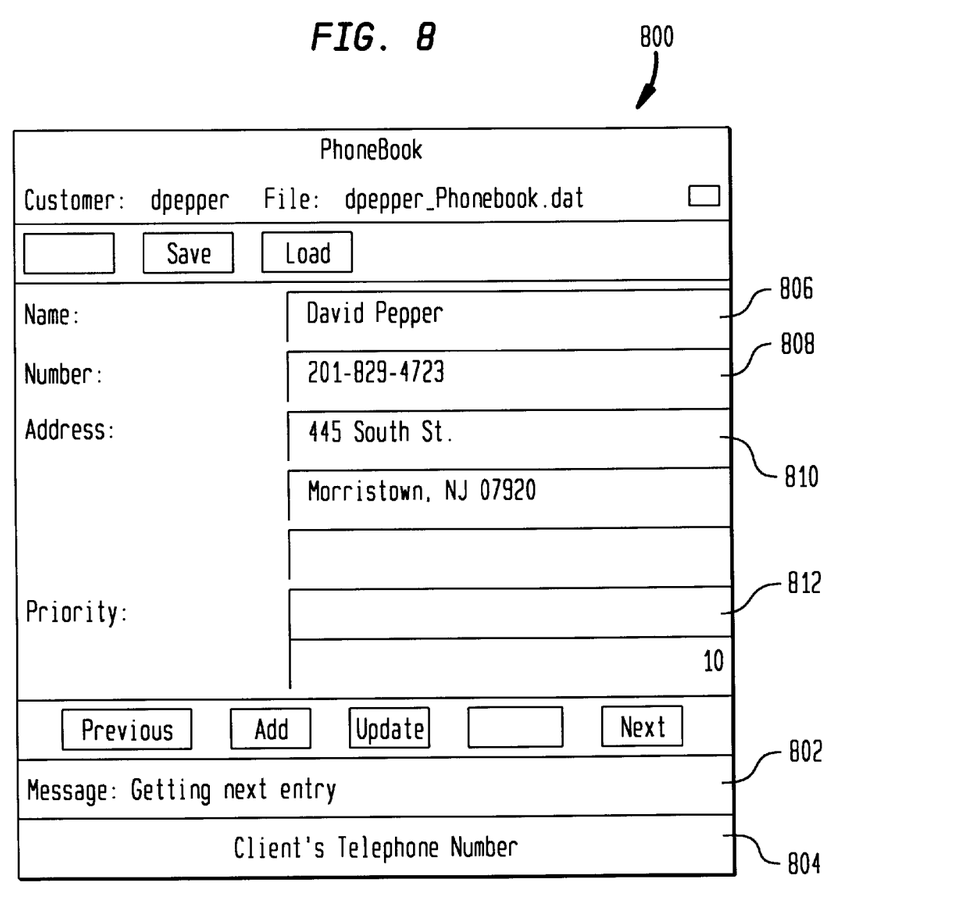
FIG. 8 is a PhoneBook screen of a graphical user interface according to a preferred embodiment of the present invention.
Figure 9:
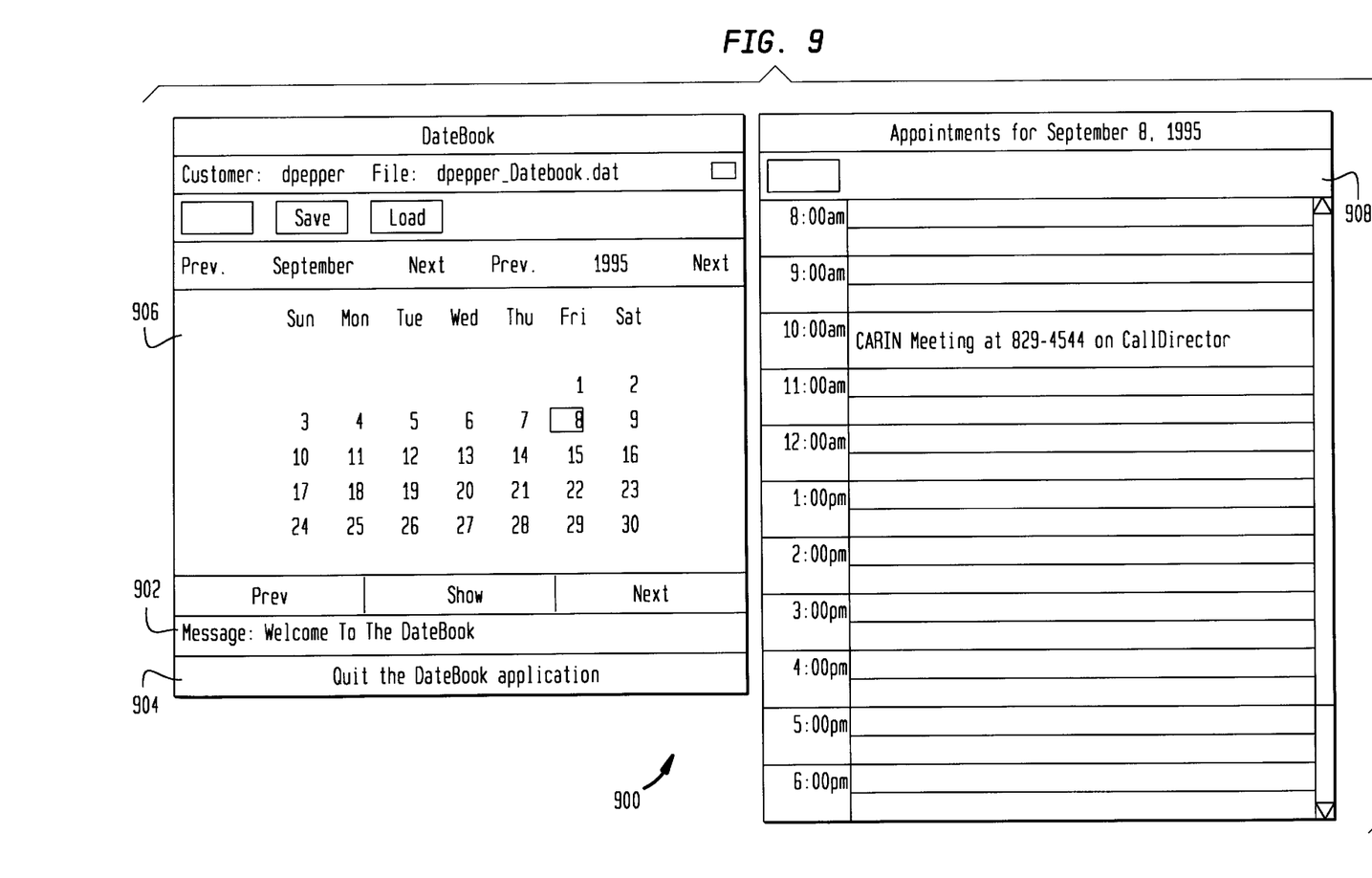
FIG. 9 is a DateBook screen of a graphical user interface according to a preferred embodiment of the present invention.

The Personal Digital Assistant (PDA) 200 Subscriber Interface is the main interface used by the subscriber to control the inventive call directing and screening system. This graphical user interface (GUI) is preferably designed to be intuitive and user-friendly. In a preferred embodiment, the GUI is presented to the user in several screens. FIG. 7 is an illustrative main menu screen 700 of the GUI. FIG. 8 is an illustrative PhoneBook screen 800. FIG. 9 is an illustrative DateBook/Appointment Calendar screen 900. A message bar 702, 802, 902 at the bottom of each screen is used to indicate the function of the currently selected button and there is a separate bar 704, 804, 904 for error or other informative messages. The interface makes use of pop-up dialog boxes 1000, 1100, such as are seen in FIGS. 10 and 11, to request additional information from the subscriber when needed and to notify the subscriber when new messages have been received by the inventive call directing and screening system and when a call is pending (e.g., 706).

In order for the inventive system to interact with the subscriber through the PDA interface, the subscriber preferably first registers with the system giving his user name and his personal identification number (PIN). When the subscriber is going to be away from his PDA for an extended period of time, he should ideally deregister from the system in order to minimize the delays experienced by his clients.

As seen in FIG. 7, the main menu screen 700 provides a window 706 which lists recently received messages and indicates the origin of the call, the type of call (e.g., voice, e-mail, fax, etc.) whether the subscriber has already read the message, and whether the caller has marked the call urgent. A subscriber may select messages in any desired order (the system is not limited by a first-in-first-out criteria imposed by most voice mail message systems), by highlighting the desired messages through the GUI. A selected message may be retrieved by pressing a "Get Message" button 708. A selected message may be "marked" (e.g., marked as read without downloading the message) or "labeled" (create a voice recognition template from the stored message) by pressing the appropriate button 710, 712. The subscriber may also select to look at a message screen, a DateBook screen, or a PhoneBook screen by pressing the appropriate button 714, 716, 718. The message button 714 permits the subscriber to update a current message panel display with newly recorded messages.

As seen in FIG. 8, a PhoneBook screen 800 provides a database for maintaining a list of names 806, phone numbers 808, and addresses 810. Each entry in the PhoneBook may be provided with a priority number from, for example, between 1–10 to indicate the importance of the person listed to the subscriber. As described in more detail below, this priority helps the inventive system to determine how an incoming call should be directed.

As seen in FIG. 9, the DateBook screen 900 provides a calendar 906 and an appointment scheduler 908 for the day selected on the calendar 906. The daily appointment calendar 908 allows the subscriber to indicate at what call delivery address (e.g., phone number, fax number, etc.) the subscriber may be reached during certain times of the day. This information permits the inventive system to direct incoming calls to that number if the call has a sufficiently high priority. A priority value may also be specified for DateBook entries to provide the subscriber with flexible control of the system.

Besides these interfaces, there are preferably interfaces for entering the subscriber's personal information (profile) and information windows for the message notification and call command interfaces to the message notification and call command modules, respectively.

In an illustrative embodiment, the GUI is preferably written in the Tool Command Language (TCL/TK) which is an interpretive programming language and its associated graphical ToolKit. Each of inventive system interfaces is preferably implemented as a separate TCL script as is the communications between the service control module 306 and the user interface in the PDA 200. A preferred embodiment of the inventive system uses UNIX TCP/IP sockets for its communications. However, Bellcore's AirBoss™ system may be preferred for a wireless connection. The TCL/TK interface may run on either a UNIX workstation or a PC with a TCL interpreter, allowing the subscriber to have the same interface while working at his desktop computer or while on the road. Because TCL is an interpretative language, the interface may be "re-programmed" by the service control module as needed to provide new services to the subscriber or to add new features to the existing interfaces, without requiring any action from the subscriber. The "re-programming" feature makes the inventive system flexible and updatable by the service provider without interaction from the subscriber.

V. The Database

The database 308 for the inventive call directing and screening system maintains a network copy of each subscriber's profile, DateBook 900, and PhoneBook 800 data. Each subscriber's data also includes any pending messages and associated information (i.e., who called, when, how long a message, etc.) as well as indications as to whether the message has been marked urgent by the caller and whether or not the subscriber has already read the message. A list of the voice templates that the subscriber's clients have passively trained may also be maintained in the database 308.

The DateBook and PhoneBook databases are used by the service control module 306 and the speaker identification templates are used by the Telephone Network Interface 304. If all databases are accessed through the SCP 105, they are downloaded to the IP 107 at the start of a call. For the mapping where the SCP 105 runs the service control module, only the template database are downloaded to the IP 107. For the other mapping, where everything is done by the IP, all three databases are downloaded by the SCP 105 to the IP 107. In a third illustrative embodiment, the databases are permanently located at a specific IP node (for a specific subscriber's data), in which case, no downloading is required. Preferably, the databases are accessed through a standard Database Server Interface.

Depending on where the databases are located in the AIN system, it may be advantageous to use a speaker identification method that uses less subscriber-specific data. One scheme which uses a common codebook rather than speaker specific code books would require less speaker specific data to be downloaded to the IP. This scheme does, however, require a larger database to be permanently located at the IP and may be less accurate than the speaker specific codebook method.

A database engine such as Oracle may be provided to allow the system to perform searches on the data stored in the database 308. For example, given a DNIS number, the engine searches the database 308 to find the subscriber that is associated with that particular number. Given an ANI number, the engine searches the subscriber's PhoneBook entries in the database 308 to find out which client, if any, is associated with that number and what that caller's priority is as assigned by the subscriber. These database routines are expandable to allow the subscriber to search for messages from a particular caller and to sort the messages in any desired fashion. Illustratively, all of the database routines are written in C and are part of the environment routines 512.

The telephone numbers at which the subscriber may be contacted throughout the day are derived from the DateBook 900 appointment calendar 908 database which shows the location and time of the subscriber's meetings and appointments. Default calling locations are derived from the subscriber's home and office information. A corporate database may also be used to translate meeting room locations into telephone numbers so that calls can be forwarded to the subscriber when he is attending on-site meetings in these rooms.

In order to determine which client's calls are the most important to the subscriber, the PhoneBook 806 name and telephone number 808 databases are used. These databases, along with the "priority" field 812, are used both to identify a call origin (using ANI), the caller (using or speaker identification), and to rank the caller (identified through speaker identification or inferred from the call origin) based on assigned priority. Once the caller's priority has been determined, the system determines whether the caller should be directly connected to the number at which the subscriber is currently located. A priority may also be assigned to items in the DateBook to be used as a minimum priority threshold to better screen incoming calls.

Depending on the priority assigned by the subscriber to a client making an incoming call to the inventive system and the subscriber's preferences, the system may handle the incoming call in different ways. The priority assigned to a currently scheduled event (or default profile entry) may also change. For example, a subscriber may instruct that only very high priority calls to be forwarded to him during a very important meeting, or to his home after 11 P.M. When making a call to the subscriber, clients assigned a high priority may be directly connected to the subscriber at the phone number provided for the subscriber's current location, which is determined by the system by checking subscriber information in the calendar database. A low priority call to the subscriber may be automatically transferred to the subscriber's voice mail system or other predetermined number. However, for calls falling into the indeterminate middle range (e.g., those clients who the subscriber only occasionally wants to speak to directly) the system will use a call in real time to the subscriber's PDA, indicate (if possible) who is calling, and query the subscriber on where to direct the call. The subscriber's response may be used to update the caller's priority, for example, if the call is accepted, the caller's priority may be increased and if the call is directed to voice mail or an attendant, the caller's priority may be decreased.

The subscriber may also be able to enter a custom message that is played out to the caller before routing him to the voice mail portion of the system. If the subscriber is not able to answer the query sent to the PDA, then the caller is automatically routed to the subscriber's voice mail system and a message may be sent to the subscriber notifying him of the call. Routing may be determined by preference thresholds set by the subscriber. Once a caller has been directed to the subscriber's voice mail system, Message Notification may be used to inform the subscriber of the waiting message. Message Notification displays a note on the subscriber's PDA 200 terminal giving the name of the caller (from either the ANI or speaker identification information, if available) and the length of the collected message. Notification may (according to the subscriber's preference) be given if the caller's priority is high enough in order to avoid disturbing the subscriber with low priority information.

VI. An Exemplary Call Flow

Figure 12A:
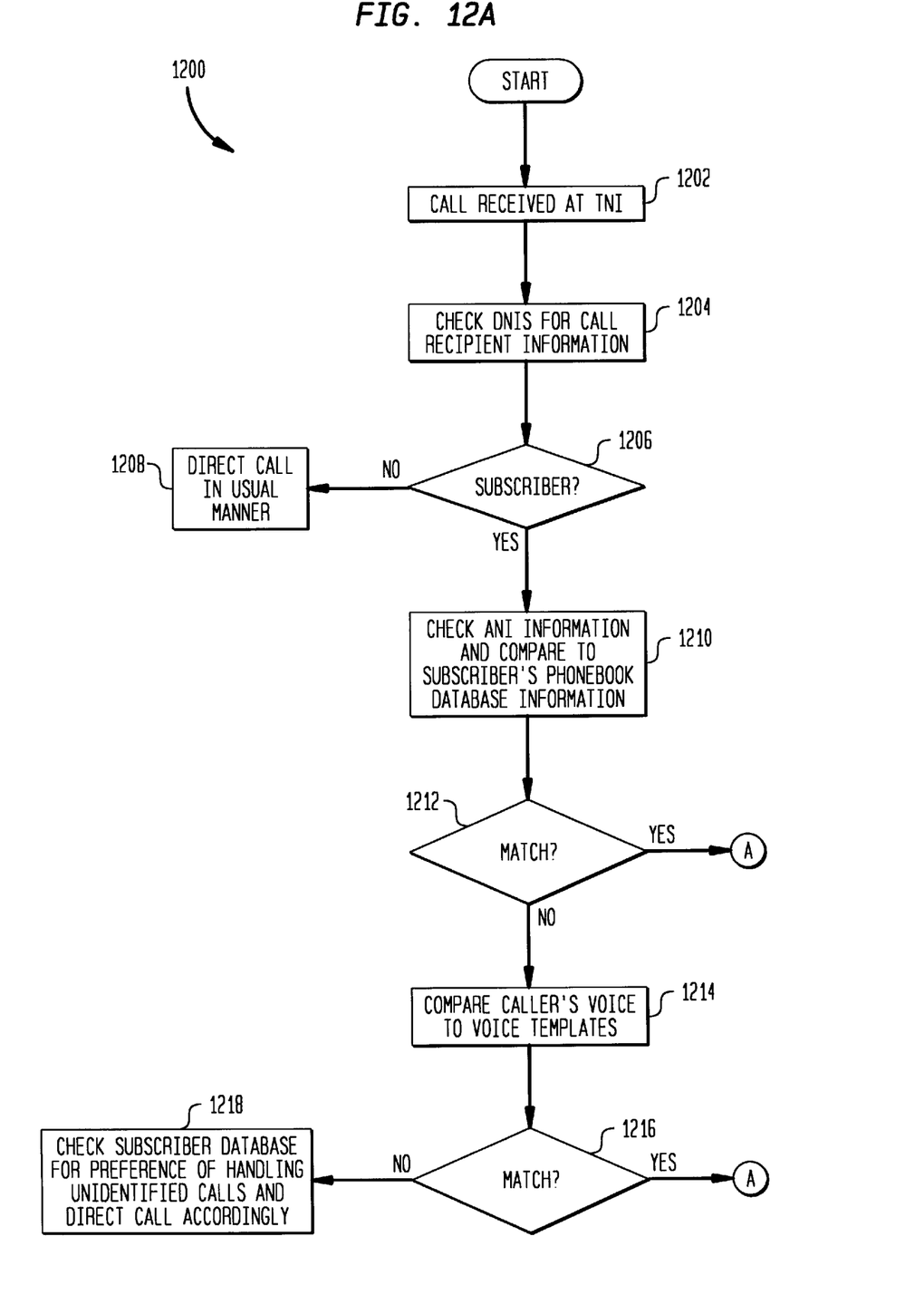
FIGS. 12A and 12B are a flowchart of a preferred method according to the present invention.
Figure 12B:
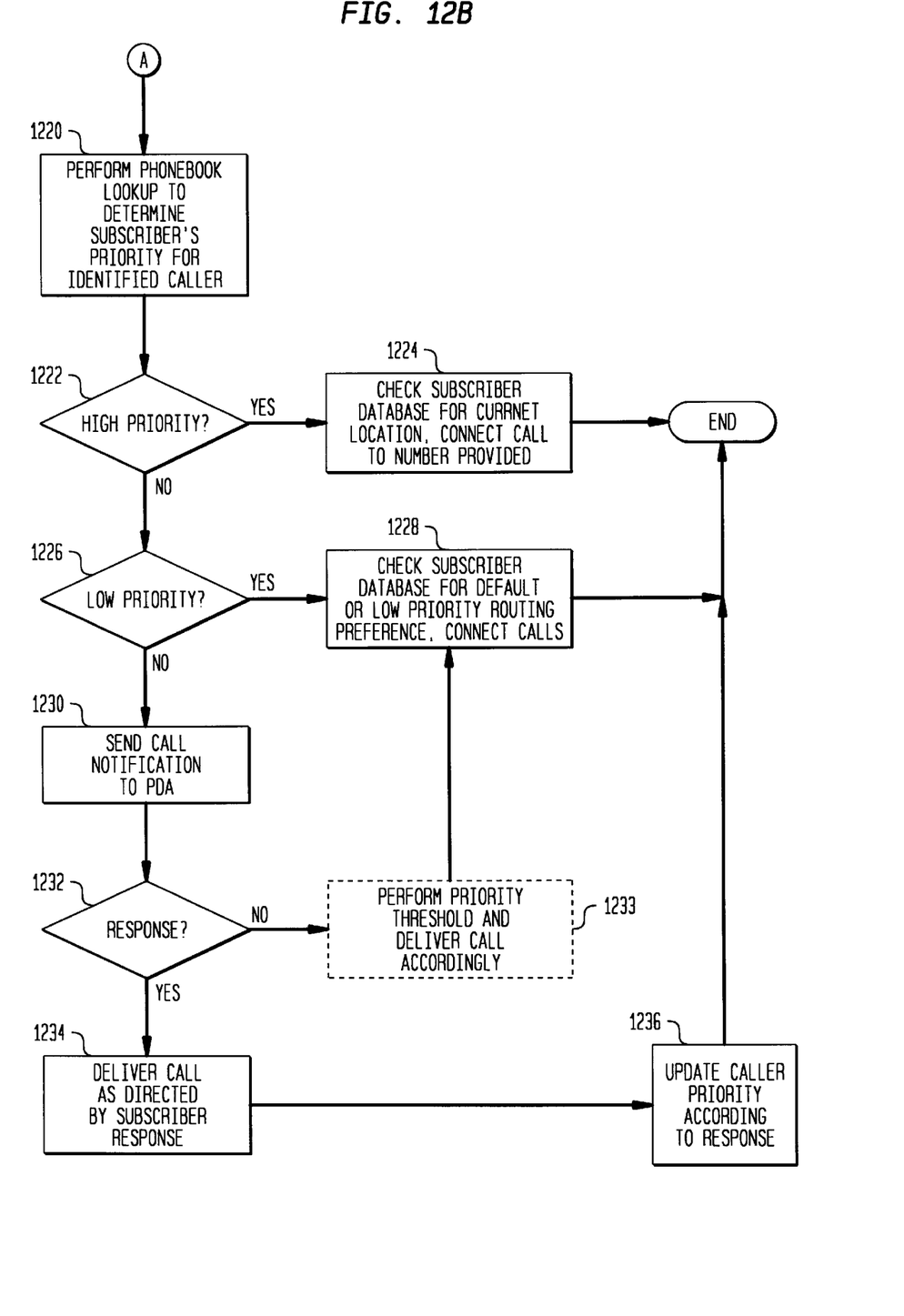

FIGS. 12A and 12B are a flow chart 1200 providing an illustrative example of how the inventive call directing and screening system handles an incoming call. It is assumed that the subscriber has already set up the DateBook and PhoneBook databases and that speaker identification templates for several clients exist and such templates have been trained from previous messages left by the clients.

In the illustrative example of FIGS. 12A and 12B, an initially unknown caller X, calls into the subscriber from an airport payphone. The call is directed to the TNI 304 (step 1202). The call may be directed to the TNI 304 in several ways. For example, the call may be placed to the subscriber's PDA wireless number or the call may be placed to the subscriber's office telephone number and the office telephone number forwards the call to TNI. The inventive system checks the DNIS information to determine if the called party is a subscriber (step 1204). If not (step 1206), the call is processed in the usual manner (step 1208). If yes (step 1206), the number from which caller X is calling (ANI information) is obtained, if available, and compared to information obtained from the subscriber's PhoneBook database (step 1210). If there is a match (step 1212), origin of the call is identified and the call is processed in a manner described below. In this case, however, caller X is calling from an unknown airport payphone, the call origin is unfamiliar to the system accessing the subscriber's information in the PhoneBook database. Thus, the call origin is unidentified. The system then prompts caller X to speak a short phrase (e.g., "Who may I say is calling, please?") which is then matched against the set of speaker identification templates associated with the subscriber's PhoneBook database (step 1214). If there is still no match (step 1216), the system checks the subscriber's database for preferences of handling unidentified calls, and the call is handled accordingly (step 1218). Here, assume the speaker identification module identifies caller X as Ms. Jones, a moderately important client of the subscriber (step 1216).

The system handles the identified caller (e.g., the identity is inferred by the call origin or the identity is established by speaker identification) in the following manner. First, the priority assigned by the subscriber to Ms. Jones is determined (step 1220) by using information obtained from the subscriber's PhoneBook database. The system may also compare this priority to the priority assigned to the current DateBook (or default profile) entry.

If Ms. Jones was assigned a high priority (step 1222), the call may be directed to the phone number at which the subscriber is currently located. Thus, the system checks the subscriber's DateBook database to obtain the phone number at which the subscriber is currently located. The call is directed to that number (step 1224).

The priority number falling within a "high priority" may vary according to the situation. For example, if a subscriber is attending a very important meeting, the subscriber may define "high priority" as callers who are ranked only nine or ten on the priority rating. On the other hand, if the subscriber is attending a less important meeting, the subscriber may define a high priority as callers having a priority rating of seven or higher.

If the caller is given a low priority (step 1226), the database is checked to find the subscriber default for low priority routing preference, and the call is connected to that number (step 1228). As with the high priority, the range of low priority ratings may be selected by the subscriber.

Assume that the subscriber has assigned an intermediate priority for Ms. Jones. Here, the system attempts to contact the subscriber's PDA to alert the subscriber that a call from Ms. Jones is pending and to provide the subscriber with a menu of call handling options (step 1230), including the option of accepting the call, delivering the call to voice mail, or routing the call to another number which may be input by the subscriber. Meanwhile, Ms. Jones is requested to please hold on and may preferably be played music or messages while she is waiting for the subscriber to respond. The notification also indicates the subscriber's current location according to the subscriber's DateBook database. If the subscriber does not respond within a predetermined time (step 1232), the call is directed according to the subscriber's default or other predetermined number (step 1228). Alternatively, the system may perform a second priority threshold such as steps 922, 926 and connect calls having a high threshold to the subscriber's current location even in the absence of a response (step 1233).

Assume that the subscriber responds to the prompt that "yes" he does wish to speak with Ms. Jones, but at an alternative location, which is an empty office adjacent to the meeting room and that the subscriber inputs the phone number for the adjacent office on the PDA 200. The PDA provides this number to the service control module 306 which directs the TNI 304 to call the subscriber at that number (step 1234). When the phone is answered, the system announces the current incoming call, verifies the subscriber's identity (i.e., may request a PIN), and then bridges Ms. Jones to the subscriber. The system then "drops—out," allowing the subscriber to begin his conversation with Ms. Jones. The fact that the subscriber did indeed wish to speak with Ms. Jones may be used to update Ms. Jones's stored priority level (step 1236).

VII. Conclusion

A system and message for controlling the delivery of incoming calls to a communications services subscriber is described. Information maintained in a database which may be accessed, for example, from a mobile communications device such as a PDA, may be used to direct calls to preferred locations according to the importance of the call to the subscriber at a particular time. The subscriber GUI is preferably standard PhoneBook and DateBook interfaces which are typically provided on a PDA 200. Thus, the inventive system may be implemented with little extra "effort" by the subscriber than would ordinarily be done by a typical PDA user.

The above described embodiments of the invention are intended to be illustrative only. Numerous alternative embodiments may be devised by those skilled in the art without departing from the spirit and scope of the following claims. For example, the invention has primarily been described with reference to telephone calls, but a person skilled in the art readily recognizes that other communication types—fax, e-mail, paging, etc.—may be screened and directed using the inventive system and method.

We claim:

1. A system for screening and directing incoming calls to a communication service subscriber and comprising a database containing
  call origin priority information,
  speech templates of voice samples of previous calling parties;
  call delivery preferences information based on the call origin priority information,
  subscriber location information, including call delivery addresses and times at which the subscriber expects to be at the call delivery addresses;

a network interface for receiving calls to the subscriber, for comparing a voice sample of a calling party to the speech templates in the database, and for determining call identification information;

a service control module for receiving the call identification information from the network interface, for obtaining information from the database, for comparing the call identification information with the call origin priority information, for determining a delivery preference based on origin priority information, and for instructing the network interface to deliver the call to a preferred destination; and a subscriber communication device containing a graphical user interface comprising a databook interface for receiving from the subscriber location information and call delivery preferences and a phone book interface for receiving from the subscriber call origin priority information.

* * * * *